Feb. 5, 1929.                                                    1,700,796
D. S. HAKE
CALOMEL ELECTRODE VESSEL
Filed Nov. 2, 1926
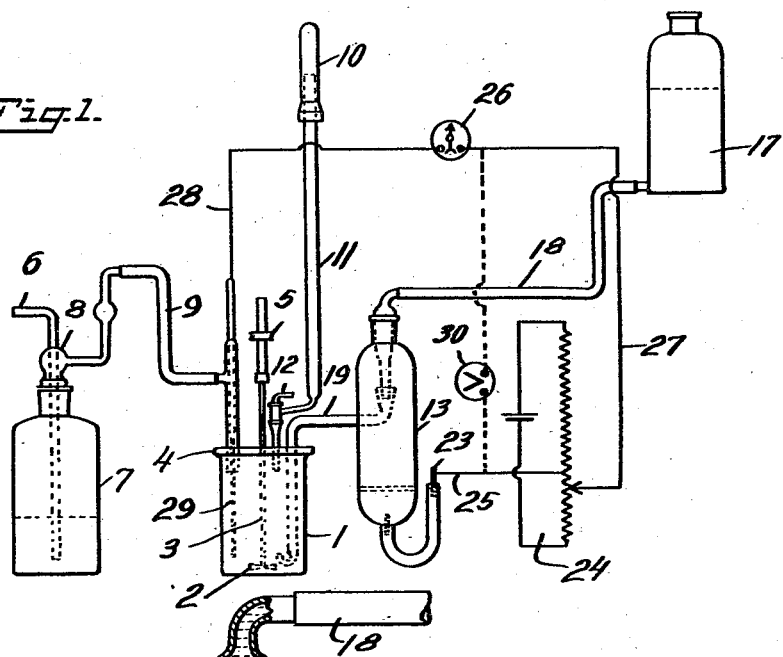
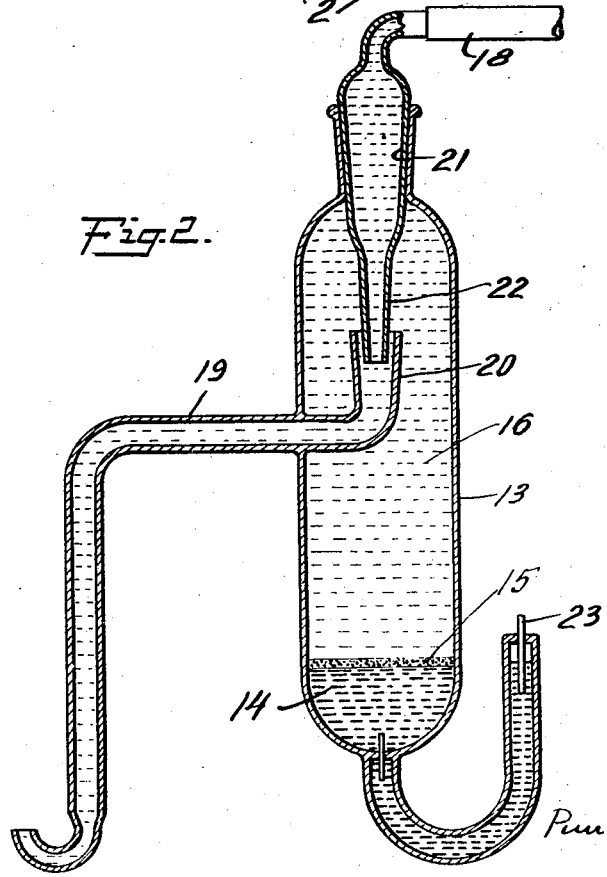
INVENTOR
Donald S. Hake
BY
Pennie, Davis, Marvin & Edmonds
ATTORNEYS Patented Feb. 5, 1929.

1,700,796

UNITED STATES PATENT OFFICE.

DONALD S. HAKE, OF NIAGARA FALLS, NEW YORK, ASSIGNOR TO ACHESON GRAPHITE COMPANY, OF NIAGARA FALLS, NEW YORK, A CORPORATION OF NEW JERSEY.

CALOMEL ELECTRODE VESSEL.

Application filed November 2, 1926. Serial No. 145,869.

In making electrometric titrations, a calomel electrode cell is employed, and is connected to the titrating cell by a contact tube. The material to be titrated is placed in the titrating cell, and the change in potential of a platinum electrode immersed in the solution is used to determine the end point of the titration.

Thus, in making titrations to determine the quantity of iron in graphites, ferrous salts in a hydrochloric acid solution are oxidized to ferric salts by standard potassium dichromate. The sample of graphite is first ashed in a crucible furnace and the residue placed in a titrating cell and the iron dissolved in a given quantity of hydrochloric acid heated to incipient boiling. The iron is reduced with a few drops of stannous chloride. The titrating cell is arranged in a circuit including a potentiometer and a calomel cell, and the circuit is completed from the titrating cell to the calomel cell by means of a contact tube containing a solution of potassium chloride.

This contact tube must be flushed at intervals during the operation to remove air bubbles which break the electric circuit and also to remove solutions formed which diffuse with potassium chloride solution in the contact tube.

In apparatus heretofore employed for this purpose the flushing solution of potassium chloride is delivered into the top of the calomel cell and the contact tube communicates with the calomel cell at a point below the top. In the flushing operation it frequently happens that some of the mercury salt in the bottom of the calomel cell is conveyed through the contact tube to the titrating cell with subsequent deleterious action on the platinum electrode in the titrating cell. This is shown by a falling off of the electromotive force.

An object of the present invention is to provide means for flushing the contact tube with potassium chloride solution without disturbing the mercury salts in the bottom of the calomel vessel.

This may be accomplished in several ways. Broadly, the invention consists in the provision of means for preventting the incoming potassium chloride solution from flowing to the bottom of the calomel electrode vessel, or, in other words, means for retaining the material in the bottom of the calomel electrode vessel in a quiescent state while the potassium chloride solution is being delivered through the top of the cell to the contact tube. A simple method of obtaining this result is to provide the contact tube with a funnel shaped end and arrange the inlet or feed pipe for the potassium chloride solution in the end of the contact tube so that the flushing solution may be delivered directly into the contact tube without disturbing the material in the calomel cell and at the same time the electric circuit from the titrating cell to the calomel cell is completed through the liquid in the contact tube.

In the accompanying drawings I have shown one form of calomel cell showing the improved contact tube. In this drawing, Fig. 1 is a diagrammatic illustration of any electrometric titration system showing the calomel cell in position, and Fig. 2 is a detail view of the calomel cell on an enlarged scale.

Referring to the drawings, the reference numeral 1 designates a titrating cell in which the titration is carried out. The cell is provided with an agitator or stirrer 2 mounted on a glass rod or shaft 3 which extends through the top 4 and is provided with a drive pulley 5. During the titration, carbon dioxide is delivered to the titrating cell from a suitable source through a pipe 6 which extends into a vessel 7. The vessel is provided with a stopper 8 having an outlet which is connected to the titrating cell by a pipe 9.

Standard potassium dichromate is placed in a stoppered burette 10 and is delivered to the titrating cell through a pipe 11 having a valved outlet 12. The calomel cell 13 is arranged adjacent the titrating cell and mercury is arranged in the bottom of the calomel cell as indicated at 14. A layer of mercurous chloride or mercurous sulfate is arranged above the mercury as indicated at 15, and the remainder of the cell is filled with potassium chloride or potassium sulfate solution 16. This solution is delivered to the cell from a reservoir 17 through a pipe 18 and the calomel cell is connected to the titrating cell by a contact tube 19, one end of which is arranged in the calomel cell, and the other end of which extends through the top of the titrating cell, as shown.

The end of the contact tube within the calomel cell is enlarged or flared as at 20, and the feed pipe 18 is connected to a hollow stopper 21, the end of which is reduced as at 11

22 to loosely fit the flared end of the contact tube so that an electric circuit will be complete at all times through the solution in the calomel cell and the contact tube. The lower end of the calomel cell is provided with a terminal 23 which is connected to a potentiometer 24 by lead wire 25. The potentiometer is in turn connected to a galvanometer 26 by lead wire 27, and the opposite side of the galvanometer is provided with a lead wire 28 connected to a platinum electrode 29 within the titrating cell. A voltmeter 30 may be connected to the wire 25 and the galvanometer as indicated in dotted lines.

In determining the amount of iron in graphite, a sample of graphite is first ashed in a crucible furnace and the residue dissolved in 50 c. c. of hydrochloric acid heated to incipient boiling and placed in the titrating cell 1. The apparatus used is essentially similar to that described by J. C. Hosteller and H. S. Roberts in their paper on electrometric titrations in the Journal of the American Chemical Society (Vol. XLI, 1338, 1919). The hot solution is reduced with a few drops of stannous chloride solution and the titrating cell introduced into the titrating apparatus. A good flow of carbon dioxide is maintained through the pipes 6 and 9 to prevent oxidation taking place. The agitator 2 is placed in operation and the beam of the galvanometer balanced by means of the potentiometer hand wheel. Standard potassium dichromate is fed from the tube 10 by the valve 12 drop by drop and the beam of the galvanometer is balanced by the hand wheel of the potentiometer, the revolutions of which are counted and which gradually increase per drop of potassium dichromate. The stannous chloride is first oxidized which point is indicated by a sharp increase in the number of revolutions. Upon further addition of potassium dichromate a decrease to a minimum results followed by an increase to a maximum and by a sharp decrease. A second maximum is the end point of the oxidation of the iron to the ferric state.

During titrating it is sometimes necessary to flush the contact tube 19. Air bubbles which break the circuit accumulate in this tube and solutions which diffuse with the potassium chloride solution are somtimes formed. In the ordinary construction of a calomel cell the incoming potassium chloride or potassium sulfate solution frequently causes some of the mercury salt in the bottom of the cell to be carried into the contact tube 19 and thence into the titrating cell. These mercury salts react with the platinum electrode 29 which is indicated by a falling off of the E. M. F. The construction of a calomel cell, in which the flushing solution can be delivered into a contact tube without disturbing the contents of the calomel cell, and at the same time maintaining the electric current between the calomel cell and the contact tube, is therefore a great advantage in the art. It will be apparent that the construction shown permits the potassium chloride solution to flow into contact tube 19 without disturbing the material in the bottom of the calomel cell. At the same time, the liquid in the tube is in communication with the liquid in the cell at all times and the circuit is thus complete through the liquid to the mercury salt and mercury in the bottom of the calomel cell and thence to the electrode 23.

While the use of the calomel electrode cell has been described in connection with a titration to determine the quantity or iron in graphite, such disclosure is merely illustrative, and the improved cell is adapted to be used in any electrometric titration.

I claim:

1. A calomel electrode cell having an inlet at its upper end for the introduction of potassium chloride solution, a contact tube extending from said cell at a point below said inlet, and means to prevent the material in the bottom of said cell from being disturbed when liquid is being fed from said inlet to said contact tube.

2. A calomel electrode cell having an inlet tube near its upper end for the introduction of potassium chloride solution and a contact tube extending from said cell at a point below said inlet, the end of said inlet tube extending into said contact tube.

3. A calomel electrode cell having an inlet tube near its upper end for the introduction of potassium chloride solution and a contact tube extending from said cell, said contact tube being of larger diameter than said inlet tube and surrounding the end of said inlet tube.

In testimony whereof I affix my signature.

DONALD S. HAKE.